(12) United States Patent
Carlino

(10) Patent No.: US 10,859,127 B2
(45) Date of Patent: Dec. 8, 2020

(54) BI-DIRECTIONAL WEDGE CLUTCH WITH LOCKUP PREVENTION

(71) Applicant: Schaeffler Technologies AG & Co. KG, Herzogenaurach (DE)

(72) Inventor: Ryan Carlino, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 141 days.

(21) Appl. No.: 16/156,195

(22) Filed: Oct. 10, 2018

(65) Prior Publication Data

US 2020/0116211 A1  Apr. 16, 2020

(51) Int. Cl.
*F16D 41/08* (2006.01)
*F16D 41/063* (2006.01)
*F16D 13/20* (2006.01)
*F16D 15/00* (2006.01)

(52) U.S. Cl.
CPC ........... *F16D 41/082* (2013.01); *F16D 13/20* (2013.01); *F16D 15/00* (2013.01); *F16D 41/063* (2013.01)

(58) Field of Classification Search
CPC ...... F16D 41/082; F16D 41/063; F16D 15/00; F16D 13/20
See application file for complete search history.

(56) References Cited

U.S. PATENT DOCUMENTS

| 2,150,715 A * | 3/1939 | De Falco | F16D 41/063 192/45.1 |
| 9,470,275 B2 | 10/2016 | Lee et al. | |
| 10,024,371 B2 * | 7/2018 | Ohr | F16D 15/00 |
| 2018/0180107 A1 * | 6/2018 | Ince | F16D 13/26 |

* cited by examiner

*Primary Examiner* — Richard M Lorence

(57) ABSTRACT

A wedge clutch, including: a hub; a carrier; a first wedge plate segment radially located between the hub and the carrier and including a first ramp sloping radially inwardly in a first circumferential direction and including a first circumferential end; a second wedge plate segment radially located between the hub and the carrier and including a second ramp sloping radially inwardly in a second circumferential direction, opposite the first circumferential direction and including a second circumferential end. In a freewheel mode of the wedge clutch, one of the hub or the carrier is rotatable with respect to the other of the hub or the carrier. In a locked mode of the wedge clutch: the hub and the carrier are non-rotatably connected for rotation of the hub in the first circumferential direction; and the first and second circumferential ends are in contact.

20 Claims, 9 Drawing Sheets

BI-DIRECTIONAL WEDGE CLUTCH WITH LOCKUP PREVENTION

TECHNICAL FIELD

The present disclosure relates to bi-directional wedge clutch with lockup prevention for switching between locked and free-wheel modes.

BACKGROUND

A known bi-directional wedge clutch includes wedge plate segments radially disposed between a hub and a carrier. The wedge plate segments may lockup, preventing a transition from a locked mode to a free-wheel mode.

SUMMARY

According to aspects illustrated herein, there is provided a wedge clutch, including: an axis of rotation; a hub; a carrier; a first wedge plate segment radially located between the hub and the carrier and including a first ramp sloping radially inwardly in a first circumferential direction and including a first circumferential end; a second wedge plate segment radially located between the hub and the carrier and including a second ramp sloping radially inwardly in a second circumferential direction, opposite the first circumferential direction and including a second circumferential end. A circle, centered on the axis of rotation and orthogonal to the axis of rotation, passes through the first wedge plate segment and the second wedge plate segment. In a free-wheel mode of the wedge clutch, one of the hub or the carrier is rotatable with respect to the other of the hub or the carrier. In a first locked mode of the wedge clutch: the hub and the carrier are non-rotatably connected for rotation of the hub in the first circumferential direction; and the first circumferential end and the second circumferential end are in contact.

According to aspects illustrated herein, there is provided a wedge clutch, including: an axis of rotation; a hub; a carrier; a first wedge plate segment radially located between the hub and the carrier and including a first ramp sloping radially inwardly in a first circumferential direction and including a first circumferential end; a second wedge plate segment radially located between the hub and the carrier and including a second ramp sloping radially inwardly in a second circumferential direction, opposite the first circumferential direction and including a second circumferential end; cage including a protrusion; and a plurality of resilient elements. A circle centered on the axis of rotation and orthogonal to the axis of rotation, passes through the first wedge plate segment and the second wedge plate segment. In a free-wheel mode of the wedge clutch, one of the hub or the carrier is rotatable with respect to the other of the hub or the carrier. In a first locked mode of the wedge clutch: the hub and the carrier are non-rotatably connected for rotation of the hub in the first circumferential direction; and the first circumferential end and the second circumferential end are in contact. To transition from the first locked mode to the free-wheel mode, the cage is arranged to be axially displaced by one of an actuator or the plurality of resilient elements to: insert the protrusion between the first circumferential end and the second circumferential end; displace the first wedge plate segment in the second circumferential direction; and displace the second wedge plate segment in the first circumferential direction.

According to aspects illustrated herein, there is provided a wedge clutch, including: an axis of rotation; a hub; a carrier including a plurality of ramps sloping radially inwardly in a first circumferential direction; a first pair of wedge plate segments radially located between the hub and the carrier and including a first wedge plate segment with a first ramp sloping radially inwardly in the first circumferential direction and a first circumferential end, and a second wedge plate segment with a second ramp sloping radially inwardly in a second circumferential direction, opposite the first circumferential direction; a second pair of wedge plate segments radially located between the hub and the carrier and including a third wedge plate segment with a third ramp sloping radially inwardly in the first circumferential direction and a second circumferential end, and a fourth wedge plate segment with a fourth ramp sloping radially inwardly in the second circumferential direction and a third circumferential end; a first resilient element circumferentially disposed between the first wedge plate segment and the second wedge plate segment and urging the first wedge plate segment and the second wedge plate segment circumferentially away from each other; a second resilient element circumferentially disposed between the third wedge plate segment and the fourth wedge plate segment and urging the third wedge plate segment and the fourth wedge plate segment circumferentially away from each other; a cage including a first protrusion and a second protrusion; and a plurality of resilient elements axially disposed between the cage and the carrier. In a free-wheel mode of the wedge clutch, one of the hub or the carrier is rotatable with respect to the other of the hub or the carrier. In a locked mode of the wedge clutch: hub and the carrier are non-rotatably connected for rotation of the hub in the first circumferential direction; the first ramp is in contact with a first ramp from the plurality of ramps; the third ramp is in contact with a second ramp from the plurality of ramps; and the first circumferential end and the third circumferential end are in contact. To transition from the locked mode to the free-wheel mode, the cage is arranged to be axially displaced by one of an actuator or the plurality of resilient elements to: insert the first protrusion between the first circumferential end and the third circumferential end; displace, with the first protrusion, the first wedge plate segment in the second circumferential direction, and the fourth wedge plate segment in the first circumferential direction; contact the second circumferential end with the second protrusion; and displace, with the second protrusion, the third wedge plate segment in the second circumferential direction.

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
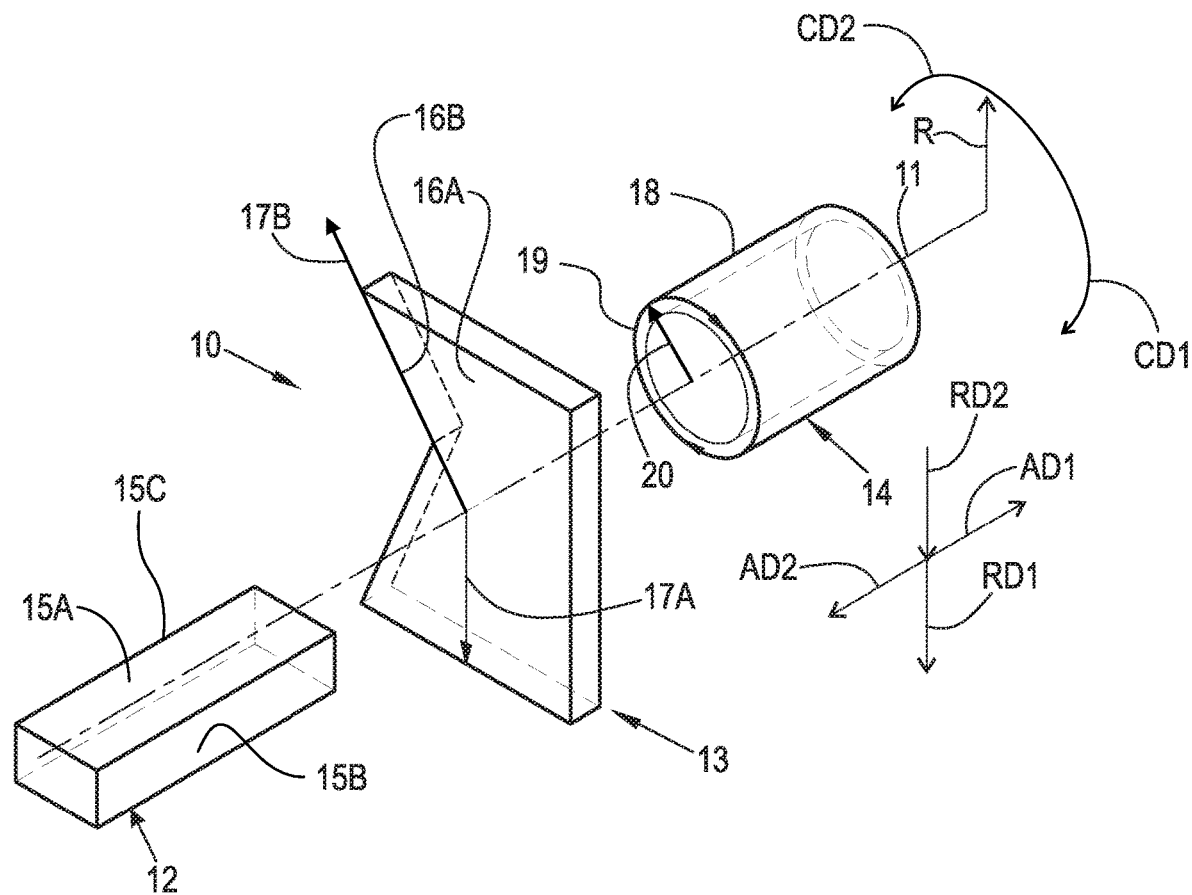
FIG. 9 is a perspective view of a cylindrical coordinate system demonstrating spatial terminology used in the present application.

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
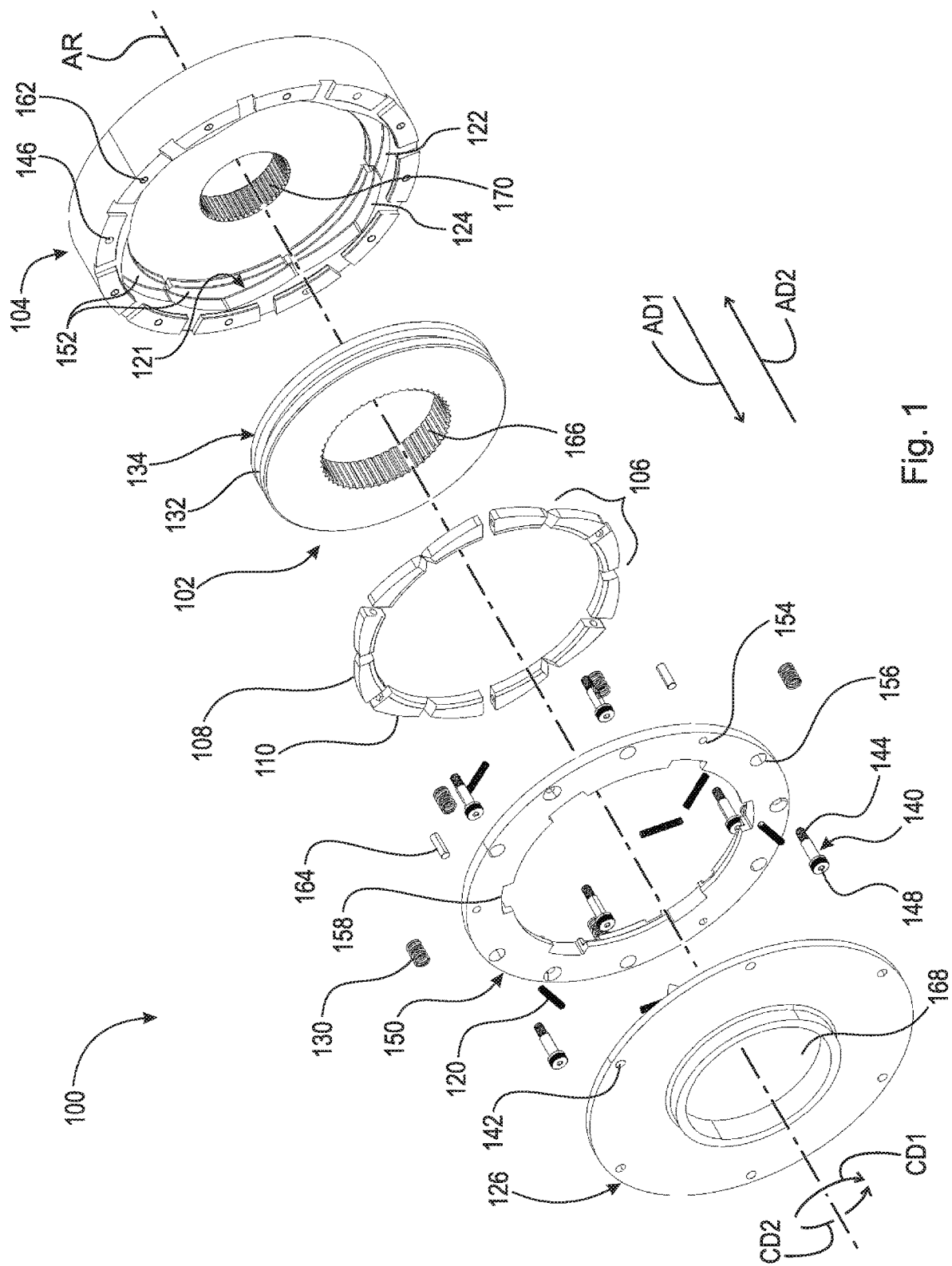
FIG. 1 is a front exploded view of a bi-directional wedge clutch.

FIG. 1 is a front exploded view of an example bi-directional wedge clutch 100.

Figure 2:
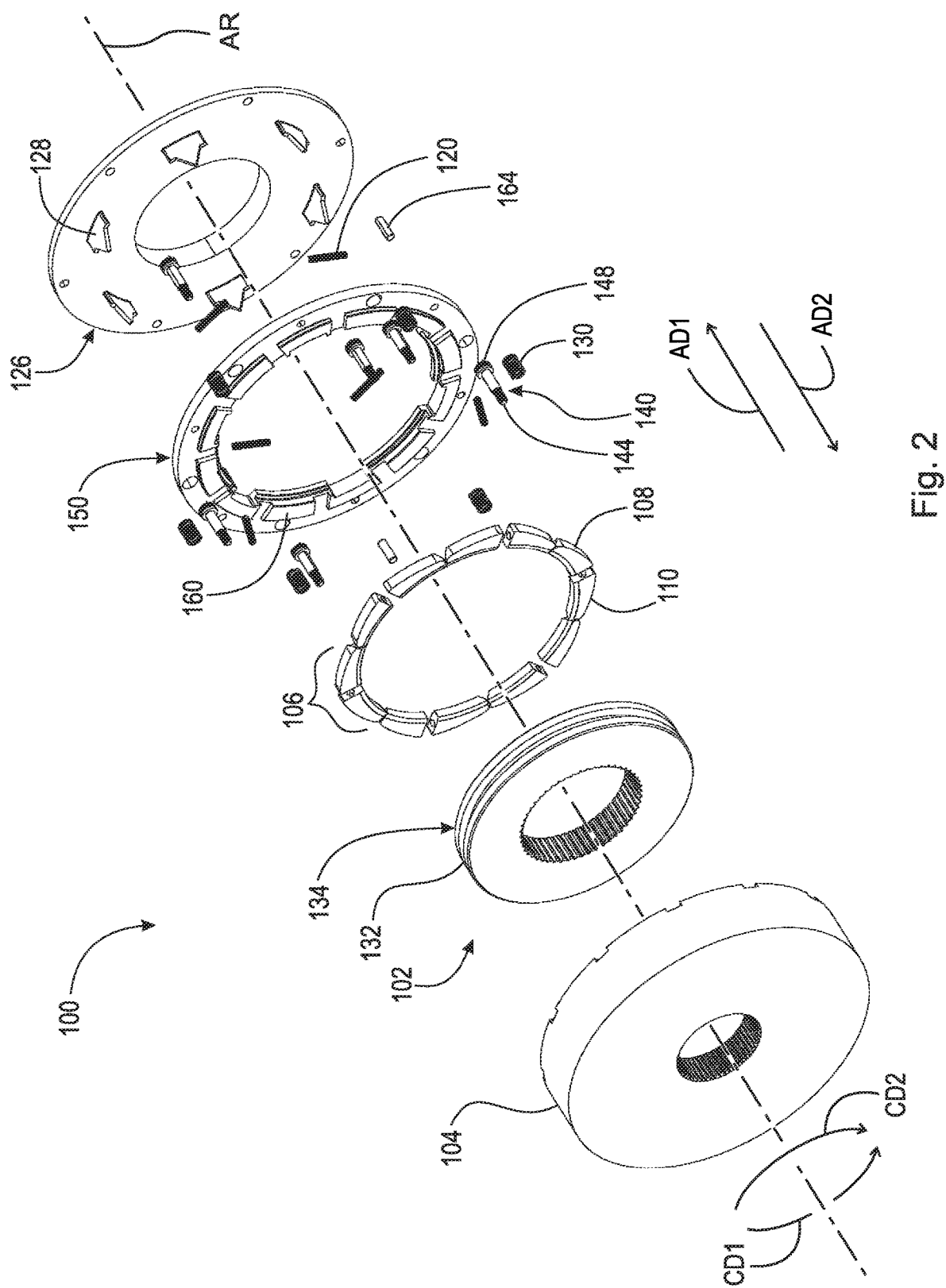
FIG. 2 is a back exploded view of the bi-directional wedge clutch shown in FIG. 1.

FIG. 2 is a back exploded view of example bi-directional wedge clutch 100 shown in FIG. 1.

Figure 3:
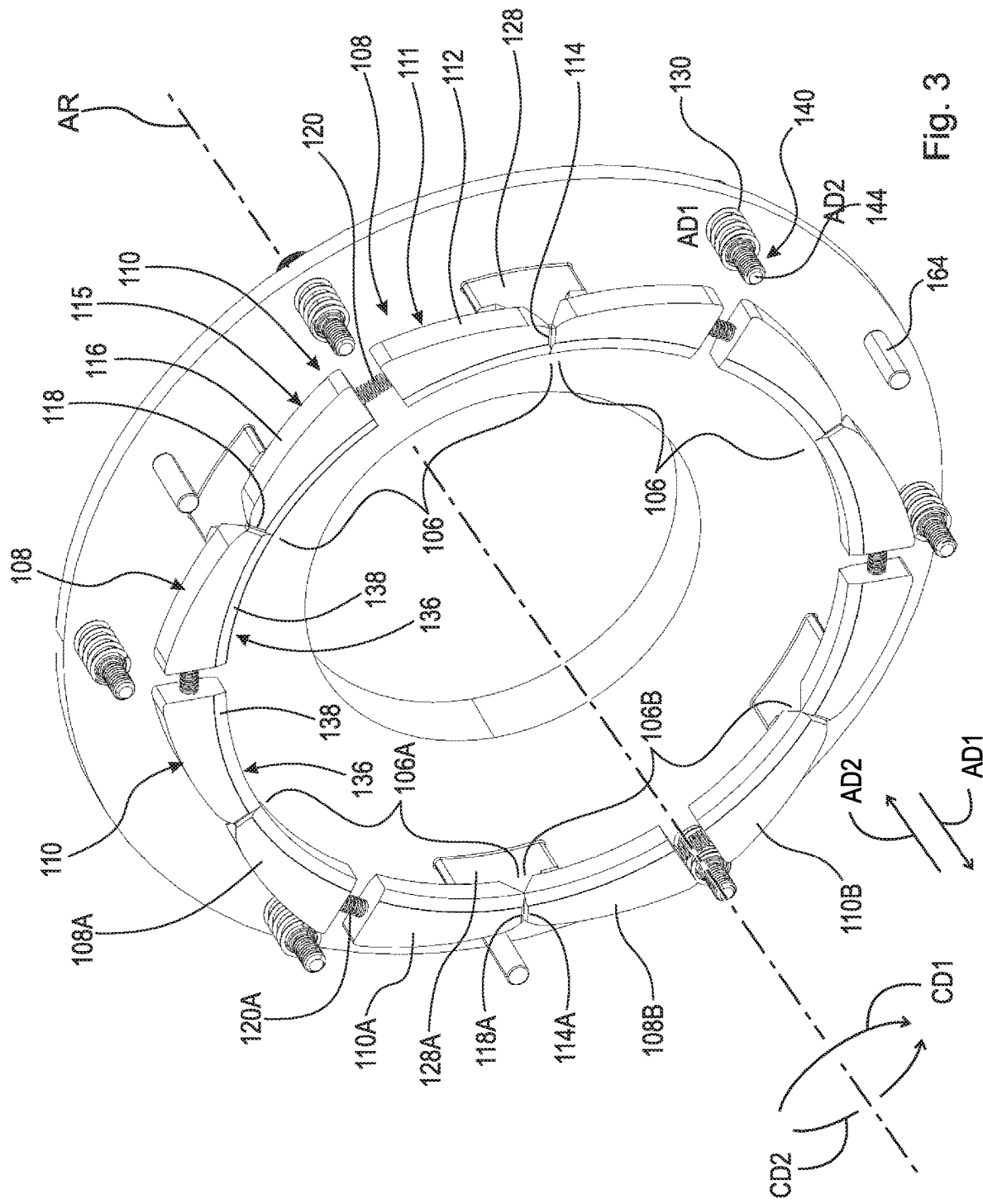
FIG. 3 is a back view of a cage and wedge plate segments of the bi-directional wedge clutch shown in FIG. 1.

FIG. 3 is a back view of a cage and wedge plate segments of bi-directional wedge clutch 100 shown in FIG. 1 The following should be viewed in light of FIGS. 1 through 3. Bi-directional wedge clutch 100 includes: axis of rotation AR; hub 102 arranged to receive rotational torque in opposite circumferential directions CD1 and CD2; carrier 104; and wedge plate pairs 106 radially located between hub 102 and carrier 104. Each pair 106 includes: wedge plate segment 108; and wedge plate segment 110. Each wedge plate segment 108 includes: radially outer surface 111 with ramp 112 sloping radially inwardly in circumferential direction CD1; and circumferential end 114. Each wedge plate segment 110 includes: radially outer surface 115 with ramp 116 sloping radially inwardly in circumferential direction CD2; and circumferential end 118. In the example of FIG. 1, clutch 100 includes six pairs 106; however, it is understood that other numbers of pairs 106 are possible.

Resilient elements, for example coil springs, 120 are circumferentially disposed between wedge plate segment 108 and wedge plate segment 110 for each pair 106. For example, resilient element 120A is circumferentially disposed between, and in contact with, wedge plate segment 108A and wedge plate segment 110A. Each element 120 urges wedge plate segment 108 and wedge plate segment 110 circumferentially away from each other. For example, element 120A urges: wedge plate segment 108A in direction CD1; and wedge plate segment 110A in direction CD2.

Figure 4:
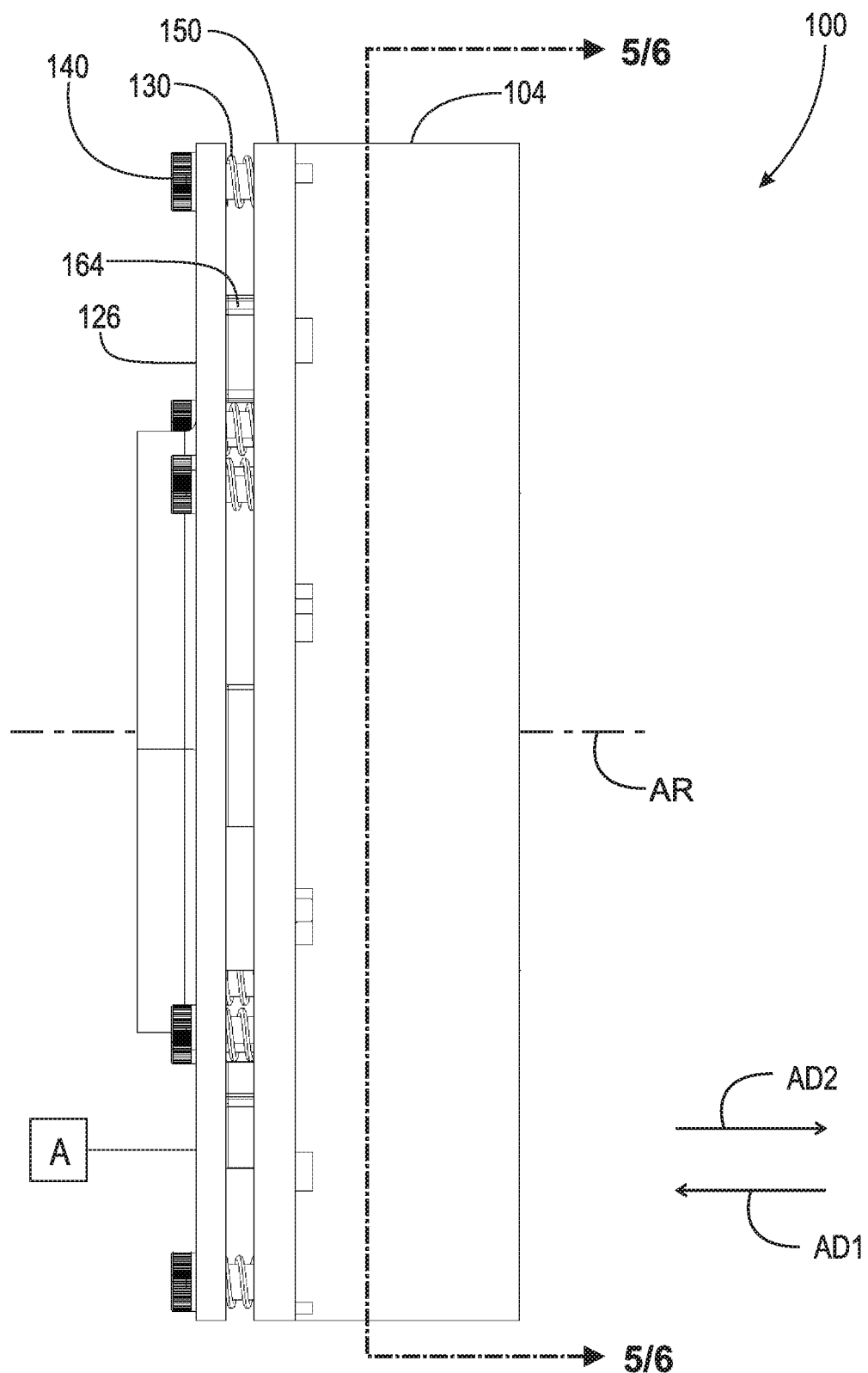
FIG. 4 is a side view of the bi-directional wedge clutch shown in FIG. 1.

FIG. 4 is a side view of bi-directional wedge clutch 100 shown in FIG. 1.

Figure 5:
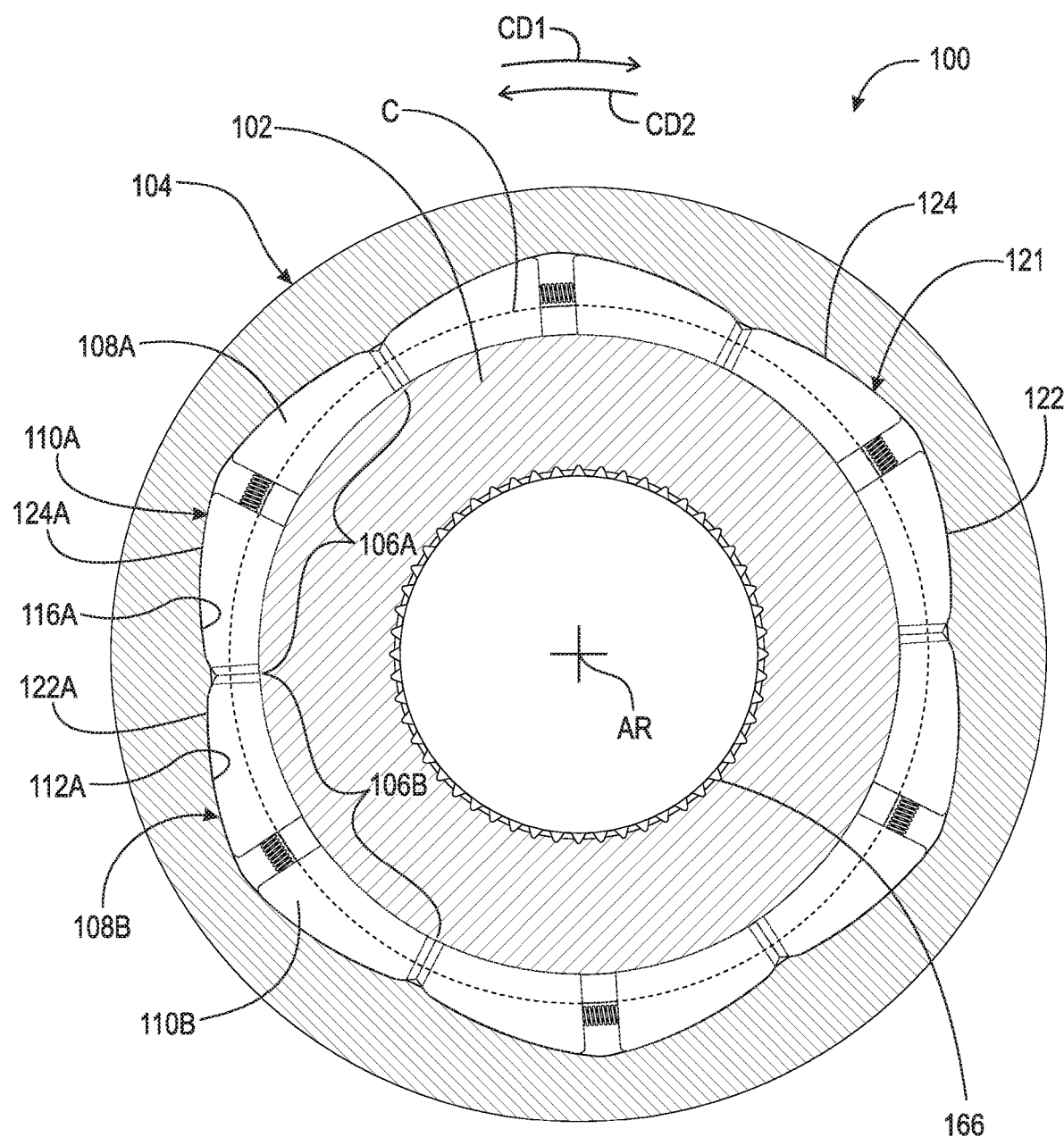
FIG. 5 is a cross-sectional view generally along line 5/6-5/6 in FIG. 4 with the bi-directional wedge clutch in a locked mode.

FIG. 5 is a cross-sectional view generally along line 5/6-5/6 in FIG. 4 with example bi-directional wedge clutch 100 in a locked mode. The following should be viewed in light of FIGS. 1 through 5. Pairs 106 are circumferentially aligned. For example, circle C, centered on axis of rotation AR and orthogonal to axis of rotation AR, passes through pair 106A and pair 106B, specifically, wedge plate segment 108A and wedge plate segment 110A for pair 106A and wedge plate segment 108B and wedge plate 110B for pair 106B. In general, a reference character "[digit][digit][digit][letter]" designates a specific example of an element labeled as "[digit][digit][digit]." For example, pair 106A is a specific example from among pairs 106.

In a first locked mode of wedge clutch 100: hub 102, wedge plate segments 108, and carrier 104 are non-rotatably connected for rotation of hub 102 in circumferential direction CD1; and circumferential ends 114 and circumferential ends 118 are in contact. In a second locked mode of wedge clutch 100: hub 102, wedge plate segments 110, and carrier 104 are non-rotatably connected for rotation of hub 102 in circumferential direction CD2; and circumferential ends 114 and circumferential ends 118 are in contact. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Carrier 104 includes radially inner surface 121 with: ramps 122 sloping radially inwardly in circumferential direction CD1; and ramps 124 sloping radially inwardly in circumferential direction CD2. In the first locked mode: wedge plate segments 108 are compressed between hub 102 and carrier 104; ramps 112 are in contact with ramps 122;

and ramps 116 are in contact with ramps 124. In the second locked mode: wedge plate segments 110 are compressed between hub 102 and carrier 104; ramps 116 are in contact with ramps 124; and ramps 112 are in contact with ramps 122.

Figure 6:
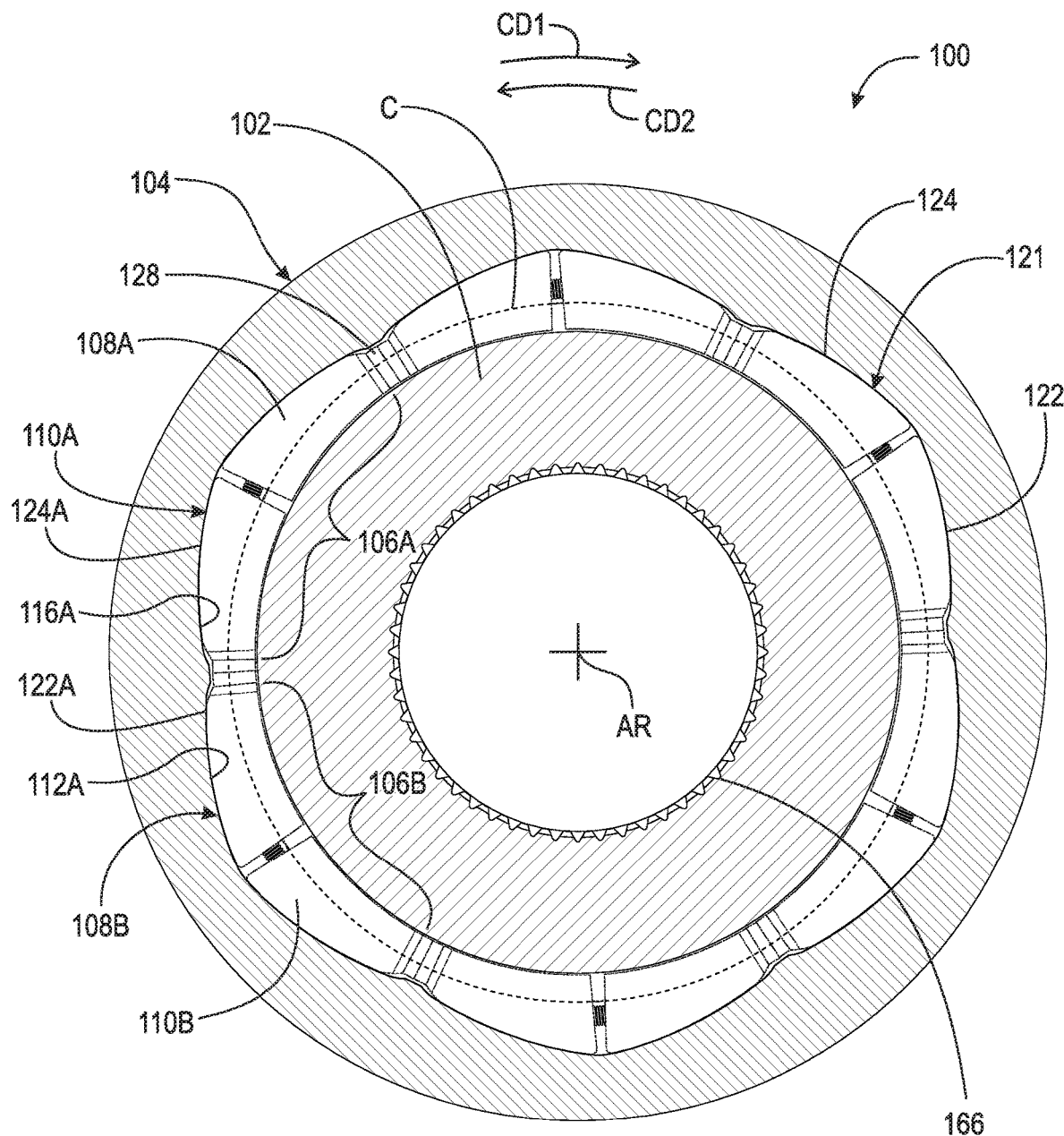
FIG. 6 is a cross-sectional view generally along line 5/6-5/6 in FIG. 4 with the bi-directional wedge clutch in a free-wheel mode.

FIG. 6 is a cross-sectional view generally along line 5/6-5/6 in FIG. 4 with bi-directional wedge clutch 100 in a free-wheel mode. In the free-wheel mode of wedge clutch 100, one of hub 102 or carrier 104 is rotatable with respect to the other of hub 102 or carrier 104. As further described below, to transition from the free-wheel mode to the first locked mode: contact between hub 102 and wedge plate segments 108 slides ramps 112 radially inwardly along ramps 122; and contact between circumferential ends 114 and circumferential ends 118 slides ramps 116 radially outwardly along ramps 124. As further described below, to transition from the free-wheel mode to the second locked mode: contact between hub 102 and wedge plate segments 110 slides ramps 116 radially inwardly along ramps 124; and contact between circumferential ends 114 and circumferential ends 118 is slides ramps 112 radially outwardly along ramps 122.

Clutch 100 includes cage 126 with protrusions 128 extending in axial direction AD1, parallel to axis AR. In an example embodiment, clutch 100 includes resilient elements 130 axially disposed between carrier 104 and cage 126. In an example embodiment, resilient elements 130 are directly engaged with, for example in contact with, carrier 104 and cage 126 and urge cage 126 in axial direction AD1 with respect to carrier 104. In an example embodiment, resilient elements 130 are directly engaged with, for example in contact with, carrier 104 and cage 126 and urge cage 126 in axial direction AD2, opposite direction AD1, with respect to carrier 104. Resilient elements 130 can be any resilient element known in the art, for example, coil springs.

The discussion that follows is directed to an example embodiment in which elements 130 displace cage 126 in direction AD1 with respect to carrier 104 and actuator A (schematically represented in the figures) displaces cage 126 in axial direction AD2 with respect to carrier 104. To transition from the first locked mode to the free-wheel mode, cage 126 is arranged to be axially displaced by actuator A in axial direction AD2 to: insert protrusions 128 between circumferential ends 114 and circumferential ends 118; displace wedge plate segments 108 in the circumferential direction CD2; slide ramps 112 radially outwardly along ramps 122; displace wedge plate segments 110 in circumferential direction CD1; and slide ramps 116 radially outwardly along ramps 124. For example, actuator A is arranged to: insert protrusion 128A between circumferential end 114A of wedge plate segment 108B in pair 106B and circumferential end 118A of wedge plate segment 110A in pair 106A. Actuator A can be any actuator known in the art.

To transition from the free-wheel mode to the first locked mode: cage is 126 arranged to be axially displaced by resilient elements 130 in axial direction AD1 (for example, actuator A is deactivated) to withdraw protrusions 128 from between circumferential ends 114 and circumferential ends 118; resilient elements 120 displace wedges plates 108 in circumferential direction CD1 to slide ramps 112 radially inwardly along ramps 122; wedge plate segments 108 are displaced radially inwardly to initiate or increase frictional contact between wedge plate segments 108 and hub 102; the frictional contact, in combination with rotation of hub 102 in direction CD1, rotates wedge plate segments 108 in direction CD1 with respect to carrier 104, further sliding ramps 112 radially inwardly along ramps 122; and wedge plate segments 108 non-rotatably connect with hub 102 and carrier 104. Resilient elements 120 also displace wedge plate segments 110 in direction CD2. As further described below, for each wedge plate segment 110, contact with a circumferentially adjacent wedge plate segment 108 displaces the wedge plate segment 110 in direction CD1 to off-set, at least partially, the displacement of wedge plate segments 110 in direction CD2 by elements 120.

To transition from the second locked mode to the free-wheel mode, cage 126 is arranged to be axially displaced by actuator A in axial direction AD2 to: insert protrusions 128 between circumferential ends 114 and circumferential ends 118; displace wedge plate segments 110 in circumferential direction CD1; slide ramps 116 radially outwardly along ramps 124; displace wedge plate segments 108 in circumferential direction CD2; and slide ramps 112 radially outwardly along ramps 122. For example, actuator A is arranged to: insert protrusion 128A between circumferential end 114A of wedge plate segment 108B in pair 106B and circumferential end 118A of wedge plate segment 110A in pair 106A.

To transition from the free-wheel mode to the second locked mode: cage is 126 arranged to be axially displaced by resilient elements 130 in axial direction AD1 (for example, actuator A is deactivated) to withdraw protrusions 128 from between circumferential ends 114 and circumferential ends 118; resilient elements 120 displace wedges plate segments 110 in circumferential direction CD2 to slide ramps 116 radially inwardly along ramps 124; wedge plate segments 110 are displaced radially inwardly to initiate or increase frictional contact between wedge plate segments 110 and hub 102; the frictional contact, in combination with rotation of hub 102 in direction CD2, rotates wedge plate segments 110 in direction CD2 with respect to carrier 104, further sliding ramps 116 radially inwardly along ramps 124; and wedge plate segments 110 non-rotatably connect with hub 102 and carrier 104. Resilient elements 120 also displace wedge plate segments 108 in direction CD1. As further described below, for each wedge plate segment 108, contact with a circumferentially adjacent wedge plate segment 110 displaces the wedge plate segment 108 in direction CD2 to off-set, at least partially, the displacement of wedge plate segments 108 in direction CD1 by elements 120.

It is understood that the above discussion, directed to an example embodiment in which elements 130 displace cage 126 in direction AD1 with respect to carrier 104 and actuator A displaces cage 126 in axial direction AD2 with respect to carrier 104, is applicable to an example in which elements 130 displace cage 126 in direction AD2 with respect to carrier 104, and actuator A displaces cage 126 in axial direction AD1 with respect to carrier 104.

Figure 7:
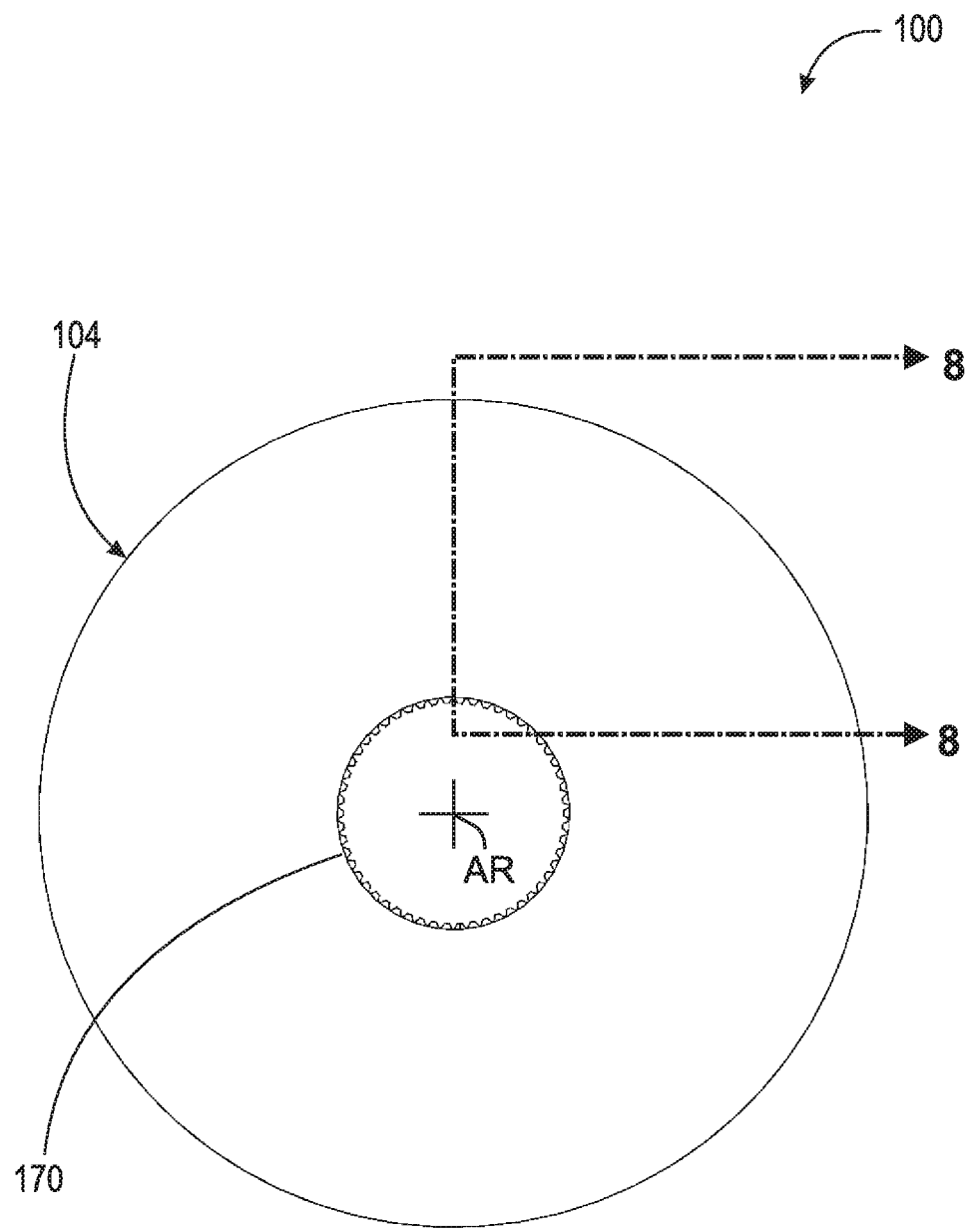
FIG. 7 is a rear view of the bi-directional wedge clutch shown in FIG. 1.

FIG. 7 is a rear view of bi-directional wedge clutch 100 shown in FIG. 1.

Figure 8:
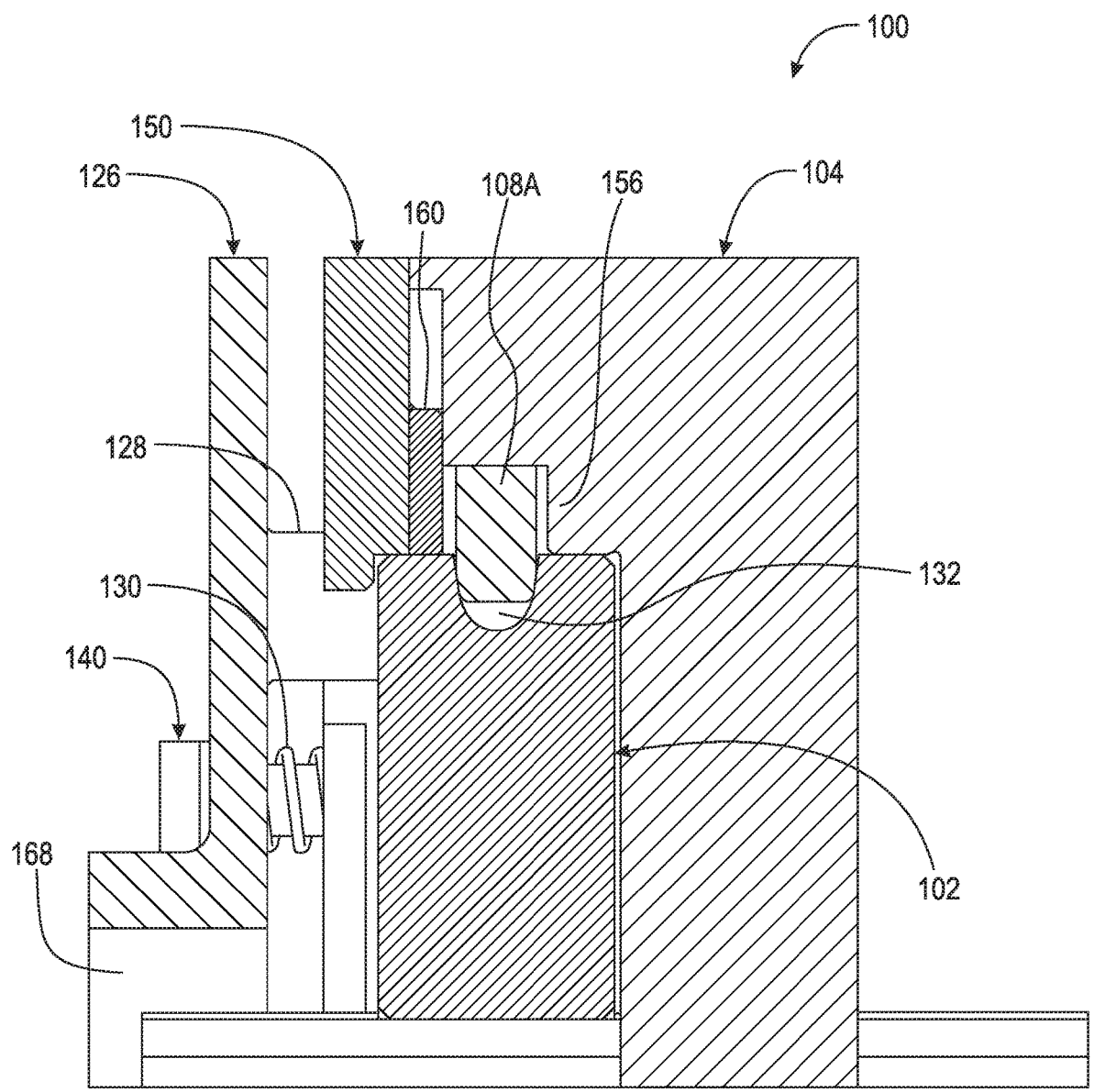
FIG. 8 is a cross-sectional view generally along line 8-8 in FIG. 7.

FIG. 8 is a cross-sectional view generally along line 8-8 in FIG. 7. The following should be viewed in light of FIGS. 1 through 8. In an example embodiment: hub 102 includes circumferential groove 132 in radially outer surface 134; and each wedge plate segment 108 and 110 includes radially inner surface 136 with taper 138. At least a portion of each taper 138 is disposed in groove 132.

In an example embodiment, clutch 100 includes pins 140 fixedly connected to carrier 104 and non-rotatably connecting cage 126 and carrier 104. For example, each pin 140 passes through a respective through-bore 142 in cage 126 and includes end 144 threaded into a respective hole 146 in carrier 104. Resilient elements 130 are coiled about pins 140 and are directly engage with, for example in contact with, carrier 104 and cage 126. To transition between the free-wheel mode and the locked modes, resilient elements 130 and actuator A axially displace cage 126, with respect to carrier 104, and cage 126 slides along pins 140 as cage 126 is displaced in directions AD1 and AD2. Heads 148 of pins 140, having larger diameters than through-bores 142, limit displacement of cage 126 in direction AD1.

In an example embodiment: clutch 100 includes cover 150; and carrier 104 includes shoulders 152. Cover 150: is axially disposed between carrier 104 and cage 126; and includes through-bores 154, through-bores 156, notches 158, and shoulders 160. Fasteners (not shown) pass through through-bores 156 and thread into holes 162 in carrier 104 to non-rotatably connect cover 150 and carrier 104. Protrusions 128 extend through notches 158. Pins 140 pass through through-bores 154. Shoulders 152 and 160 axially bracket and axially restrain wedge plate segments 108 and 110. In an example embodiment, clutch 100 includes pins 164 fixed to carrier 104 and cover 150. Pins 164 rotationally position cover 150 with respect to carrier 104.

In an example embodiment: hub 102 includes splines 166 arranged to non-rotatably connect to a shaft (not shown) supplying the rotational torque to hub 102; cage 126 includes central opening 168 through which the shaft supplying the rotational torque to hub 102 is arranged to pass; and carrier 104 includes splines 170, arranged to non-rotatably connect to a shaft (not shown) and receive torque from carrier 104 in the first and second locked modes.

As noted above, wedge plate segments for a known wedge clutch may lockup, preventing a transition from a locked mode to a free-wheel mode. However, contact between circumferential ends 114 and circumferential ends 118 in the first and second locked modes prevents wedge plate segments 108 and 110 from locking up, enabling a reliable transition for clutch 100 between the first and second locked modes and the free-wheel mode.

Contact between ends 114 and 118 prevents one of wedge plate segment 108 or 110 for each pair 106 from being under load as torque is released from hub 102, that is, as the transition from a locked mode to the free-wheel mode is initiated. The following uses pairs 106A and 106B as an example for a transition from the first locked mode to the free-wheel mode. Ends 114A and 118A are pushed into contact with each other in a static, locked position of clutch 100 (protrusions 128 withdrawn and segments 108B and 110A are displaced in directions CD1 and CD2, respectively, by elements 120) with torque not yet applied to hub 102. For the first locked mode (torque applied to hub 102 in direction CD1), contact between end 114A of segment 108B and end 118A of segment 110A causes segment 108B to push segment 110A in direction CD1 as the torque is applied to hub 102. Pushing segment 110A in direction CD1 slides ramp 116A radially outwardly along ramp 124A such that segment 110A displaces radially away from hub 102 and is not jammed between hub 102 and carrier 104. Thus, when the torque in direction CD1 is removed from hub 102, wedge plate segment 108B is not loaded (jammed between hub 102 and carrier 104), wedge plate segment 110A is not loaded (not positioned to cause immediate lockup upon release of the torque), and cage 126 is able to insert protrusion 128A between ends 114A and 118A to transition clutch 100 to the free-wheel mode.

The following uses pairs 106A and 106B as an example for a transition from the second locked mode to the free-wheel mode. Ends 114A and 118A contact each other in a static, locked position (protrusions 128 withdrawn and segments 108B and 110A displaced in directions CD1 and CD2, respectively) with torque not yet applied to hub 102. For the second locked mode (torque applied to hub 102 in direction CD2), resilient element 120A pushes circumferential ends 114A and 118B into contact, and the contact between end 114A and end 118A causes segment 110A to push segment 108B in direction CD2 as the torque is applied to hub 102. Pushing segment 108B in direction CD2 slides ramp 112A radially outwardly along ramp 122A such that segment 108B displaces radially away from hub 102 and is not jammed between hub 102 and carrier 104. Thus, when the torque in direction CD2 is removed from hub 102, wedge plate segment 110A is not loaded (jammed between hub 102 and carrier 104), wedge plate segment 108B is not loaded (not positioned to cause immediate lockup upon release of the torque), and cage 126 is able to insert protrusion 128A between ends 114A and 118A to transition clutch 100 to the free-wheel mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
A actuator
AR axis of rotation
C circle
100 wedge clutch
102 hub
104 carrier
106 wedge plate pair
106A wedge plate pair
106B wedge plate pair
108 wedge plate
108A wedge plate
108B wedge plate
110 wedge plate
110A wedge plate
110B wedge plate
111 radially outer surface, wedge plate 108
112 ramp, wedge plate 108

112A ramp, wedge plate 108B
114 circumferential end, wedge plate 108
114A circumferential end, wedge plate 108B
115 radially outer surface, wedge plate 110
116 ramp, wedge plate 110
116A ramp, wedge plate 110A
118 circumferential end, wedge plate 110
118A circumferential end, wedge plate 110A
120 resilient element
120A resilient element, pair 106A
121 radially inner surface, carrier
122 ramp, carrier
122A ramp, carrier
124 ramp, carrier
124A ramp, carrier
126 cage
128 protrusion
128A protrusion
130 resilient element
132 circumferential groove, hub
134 radially outer surface, hub
136 radially inner surface, wedge plate
138 taper, wedge plate
140 pin
142 through-bore, cage
144 end, pin
146 hole, carrier
148 head, pin 140
150 cover
152 shoulder, carrier
154 through-bore, cover
156 through-bore, cover
158 notch, cover
160 shoulder, cover
162 hole, carrier
164 pin
166 spline, hub
168 central opening, cage
170 spline, carrier

The invention claimed is:

1. A wedge clutch, comprising:
an axis of rotation;
a hub;
a carrier;
a first wedge plate segment radially located between the hub and the carrier and including a first ramp, the first ramp:
sloping radially inwardly in a first circumferential direction; and,
including a first circumferential end;
a second wedge plate segment radially located between the hub and the carrier and including a second ramp, the second ramp:
sloping radially inwardly in a second circumferential direction, opposite the first circumferential direction; and,
including a second circumferential end; and,
a cage including a first protrusion, wherein:
a circle, centered on the axis of rotation and orthogonal to the axis of rotation, passes through the first wedge plate segment and the second wedge plate segment;
in a free-wheel mode of the wedge clutch, one of the hub or the carrier is rotatable with respect to the other of the hub or the carrier;
in a first locked mode of the wedge clutch:

the hub and the carrier are non-rotatably connected for rotation of the hub in the first circumferential direction; and,
the first circumferential end and the second circumferential end are in contact; and
to transition from the first locked mode to the free-wheel mode, the cage is arranged to be axially displaced to insert the first protrusion between the first circumferential end and the second circumferential end.

2. The wedge clutch of claim 1, wherein the carrier includes:
a third ramp sloping radially inwardly in the first circumferential direction; and,
a fourth ramp sloping radially inwardly in the second circumferential direction; and,
in the first locked mode:
the first ramp is in contact with the third ramp; and,
the second ramp is in contact with the fourth ramp.

3. The wedge clutch of claim 1, further comprising:
a plurality of resilient elements, wherein to transition from the first locked mode to the free-wheel mode, the cage is arranged to be axially displaced by one of an actuator or the plurality of resilient elements to:
insert the first protrusion between the first circumferential end and the second circumferential end;
displace the first wedge plate segment in the second circumferential direction; and,
displace the second wedge plate segment in the first circumferential direction.

4. The wedge clutch of claim 3, further comprising:
a first resilient element urging the first wedge plate segment in the first circumferential direction, wherein to transition from the free-wheel mode to the first locked mode:
the cage is arranged to be axially displaced by the other of the actuator or the plurality of resilient elements to withdraw the first protrusion from between the first circumferential end and the second circumferential end;
the first resilient element is arranged to displace the first wedge plate in the first circumferential direction to contact the second circumferential end with the first circumferential end; and,
the first wedge plate segment is arranged to displace the second wedge plate segment in the first circumferential direction.

5. The wedge clutch of claim 1, further comprising:
a first pair of wedge plate segments; and,
a second pair of wedge plate segments, wherein:
the first pair of wedge plate segments includes:
the first wedge plate segment; and,
a third wedge plate segment with a third ramp sloping radially inwardly in the second circumferential direction; and,
the second pair of wedge plate segments includes:
the second wedge plate segment; and,
a fourth wedge plate segment with a fourth ramp sloping radially inwardly in the first circumferential direction, the wedge clutch further comprising:
a first resilient element:
circumferentially disposed between the first wedge plate segment and the third wedge plate segment and urging the first wedge plate segment and the third wedge plate segment circumferentially away from each other; and,
a second resilient element:

circumferentially disposed between the second wedge plate segment and the fourth wedge plate segment and urging the second wedge plate segment and the fourth wedge plate segment circumferentially away from each other.

6. The wedge clutch of claim 5, further comprising:
a plurality of resilient elements, wherein to transition from the first locked mode to the free-wheel mode, the cage is arranged to be axially displaced by one of an actuator or the plurality of resilient elements to:
insert the first protrusion between the first circumferential end and the second circumferential end;
displace the first wedge plate segment in the second circumferential direction; and,
displace the second wedge plate segment in the first circumferential direction.

7. The wedge clutch of claim 6, further comprising:
a third pair of wedge plate segments; and,
a third resilient element, wherein:
the fourth wedge plate segment includes a third circumferential end;
the cage includes a second protrusion;
the third pair of wedge plate segments includes:
a fifth wedge plate segment with a fifth ramp sloping radially inwardly in the first circumferential direction;
a sixth wedge plate segment with:
a sixth ramp sloping radially inwardly in the second circumferential direction; and,
a fourth circumferential end; and,
the third resilient element is circumferentially disposed between the fifth wedge plate segment and the sixth wedge plate segment and urges the fifth wedge plate segment and the sixth wedge plate segment circumferentially away from each other;
to transition from the first locked mode to the free-wheel mode, the cage is arranged to be axially displaced by the one of the actuator or the plurality of resilient elements to:
insert the second protrusion between the third circumferential end and the fourth circumferential end;
displace the fourth wedge plate segment in the second circumferential direction; and,
displace the sixth wedge plate segment in the first circumferential direction.

8. The wedge clutch of claim 6, wherein:
the carrier includes:
a fifth ramp sloping radially inwardly in the first circumferential direction; and,
a sixth ramp sloping radially inwardly in the second circumferential direction; and,
to transition from the first locked mode to the free-wheel mode, the first protrusion is arranged to:
slide the first ramp radially outwardly along the fifth ramp in the second circumferential direction; and,
slide the second ramp radially outwardly along the sixth ramp in the first circumferential direction.

9. The wedge clutch of claim 6, wherein to transition from the free-wheel mode to the first locked mode:
the cage is arranged to be axially displaced by the other of the actuator or the plurality of resilient elements to withdraw the first protrusion from between the first circumferential end and the second circumferential end; and,
the first resilient element is arranged displace the first wedge plate segment in the first circumferential direction.

10. The wedge clutch of claim 9, wherein:
the carrier includes a fifth ramp sloping radially inwardly in the first circumferential direction; and,
to transition from the free-wheel mode to the first locked mode, the first resilient element is arranged to slide the first ramp radially inwardly along the fifth ramp in the first circumferential direction.

11. The wedge clutch of claim 6, wherein:
in a second locked mode of the wedge clutch:
the hub and the carrier are non-rotatably connected for rotation of the hub in the second circumferential direction; and,
the first circumferential end and the second circumferential end are in contact;
to transition from the second locked mode to the free-wheel mode, the cage is arranged to be axially displaced by the one of the actuator or the plurality of resilient elements to:
insert the first protrusion between the first circumferential end and the second circumferential end;
displace the first wedge plate segment in the second circumferential direction; and,
displace the second wedge plate segment in the first circumferential direction.

12. The wedge clutch of claim 5, further comprising:
a plurality of resilient elements, wherein:
in a second locked mode of the wedge clutch:
the hub and the carrier are non-rotatably connected for rotation of the hub in the second circumferential direction; and,
the first circumferential end and the second circumferential end are in contact; and,
to transition from the second locked mode to the free-wheel mode, the cage is arranged to be axially displaced by one of an actuator or the plurality of resilient elements to:
insert the first protrusion between the first circumferential end and the second circumferential end;
displace the first wedge plate segment in the second circumferential direction; and,
displace the second wedge plate segment in the first circumferential direction.

13. The wedge clutch of claim 12, wherein to transition from the free-wheel mode to the second locked mode:
the cage is arranged to be axially displaced by the other of the actuator or the plurality of resilient elements to withdraw the first protrusion from between the first circumferential end and the second circumferential end; and,
the second resilient element is arranged displace the second wedge plate segment in the second circumferential direction.

14. The wedge clutch of claim 5, wherein:
the third wedge plate segment includes a third circumferential end; and,
the fourth wedge plate segment includes a fourth circumferential end, the wedge clutch further comprising:
a fifth wedge plate segment radially located between the hub and the carrier and including:
a fifth ramp sloping radially inwardly in the first circumferential direction; and,
a fifth circumferential end; and,
a sixth wedge plate segment radially located between the hub and the carrier and including:
a sixth ramp sloping radially inwardly in the second circumferential direction; and, a sixth circumferential end, wherein in the first locked mode of the wedge clutch:
the third circumferential end and the fifth circumferential end are in contact; and,
the fourth circumferential end and the sixth circumferential end are in contact.

15. A wedge clutch, comprising:
an axis of rotation;
a hub;
a carrier;
a first wedge plate segment radially located between the hub and the carrier and including a first ramp, the first ramp:
    sloping radially inwardly in a first circumferential direction; and,
    including a first circumferential end;
a second wedge plate segment radially located between the hub and the carrier and including a second ramp, the second ramp:
    sloping radially inwardly in a second circumferential direction, opposite the first circumferential direction; and,
    including a second circumferential end;
a cage including a protrusion; and,
a plurality of resilient elements, wherein:
    a circle, centered on the axis of rotation and orthogonal to the axis of rotation, passes through the first wedge plate segment and the second wedge plate segment;
    in a free-wheel mode of the wedge clutch, one of the hub or the carrier is rotatable with respect to the other of the hub or the carrier;
    in a first locked mode of the wedge clutch:
        the hub and the carrier are non-rotatably connected for rotation of the hub in the first circumferential direction; and,
        the first circumferential end and the second circumferential end are in contact; and,
    to transition from the first locked mode to the free-wheel mode, the cage is arranged to be axially displaced by one of an actuator or the plurality of resilient elements to:
        insert the protrusion between the first circumferential end and the second circumferential end;
        displace the first wedge plate segment in the second circumferential direction; and,
        displace the second wedge plate segment in the first circumferential direction.

16. The wedge clutch of claim 15, further comprising:
a first pair of wedge plate segments; and,
a second pair of wedge plate segment, wherein:
    the first pair of wedge plate segments includes:
        the first wedge plate segment; and,
        a third wedge plate segment with a third ramp sloping radially inwardly in the second circumferential direction; and,
    the second pair of wedge plate segments includes:
        the second wedge plate segment; and,
        a fourth wedge plate segment with a fourth ramp sloping radially inwardly in the first circumferential direction, the wedge clutch further comprising:
a first resilient element:
    circumferentially disposed between the first wedge plate segment and the third wedge plate segment and urging the first wedge plate segment and the third wedge plate segment circumferentially away from each other; and,
a second resilient element:
    circumferentially disposed between the second wedge plate segment and the fourth wedge plate segment and urging the second wedge plate segment and the fourth wedge plate segment circumferentially away from each other.

17. The wedge clutch of claim 16, wherein to transition from the free-wheel mode to the first locked mode:
    the cage is arranged to be axially displaced by the other of the actuator or the plurality of resilient elements to withdraw the protrusion from between the first circumferential end and the second circumferential end;
    the first resilient element is arranged displace the first wedge plate segment in the first circumferential direction; and,
    the second resilient element is arranged displace the fourth wedge plate segment in the first circumferential direction.

18. The wedge clutch of claim 16, wherein:
in a second locked mode of the wedge clutch:
    the hub and the carrier are non-rotatably connected for rotation of the hub in the second circumferential direction; and,
    the first circumferential end and the second circumferential end are in contact;
to transition from the second locked mode to the free-wheel mode, the cage is arranged to be axially displaced by the one of the actuator or the plurality of resilient elements to:
    insert the protrusion between the first circumferential end and the second circumferential end;
    displace the first wedge plate segment in the second circumferential direction; and,
    displace the second wedge plate segment in the first circumferential direction; and,
to transition from the free-wheel mode to the second locked mode:
    the cage is arranged to be axially displaced by the other of the actuator or the plurality of resilient elements to withdraw the protrusion from between the first circumferential end and the second circumferential end;
    the first resilient element is arranged displace the third wedge plate segment in the second circumferential direction; and,
    the second resilient element is arranged displace the second wedge plate segment in the second circumferential direction.

19. A wedge clutch, comprising:
an axis of rotation;
a hub;
a carrier including a plurality of ramps sloping radially inwardly in a first circumferential direction;
a first pair of wedge plate segments radially located between the hub and the carrier and including:
    a first wedge plate segment with:
        a first ramp sloping radially inwardly in the first circumferential direction; and,
        a first circumferential end; and,
    a second wedge plate segment with a second ramp sloping radially inwardly in a second circumferential direction, opposite the first circumferential direction;
a second pair of wedge plate segments radially located between the hub and the carrier and including:
    a third wedge plate segment with:
        a third ramp sloping radially inwardly in the first circumferential direction; and,
        a second circumferential end; and, a fourth wedge plate segment with:
  a fourth ramp sloping radially inwardly in the second circumferential direction; and,
  a third circumferential end;
a first resilient element circumferentially disposed between the first wedge plate segment and the second wedge plate segment and urging the first wedge plate segment and the second wedge plate segment circumferentially away from each other;
a second resilient element circumferentially disposed between the third wedge plate segment and the fourth wedge plate segment and urging the third wedge plate segment and the fourth wedge plate segment circumferentially away from each other;
a cage including a first protrusion and a second protrusion; and,
a plurality of resilient elements axially disposed between the cage and the carrier, wherein:
  in a free-wheel mode of the wedge clutch, one of the hub or the carrier is rotatable with respect to the other of the hub or the carrier;
  in a locked mode of the wedge clutch:
    the hub and the carrier are non-rotatably connected for rotation of the hub in the first circumferential direction;
    the first ramp is in contact with a first ramp from the plurality of ramps;
    the third ramp is in contact with a second ramp from the plurality of ramps; and,
    the first circumferential end and the third circumferential end are in contact; and,
  to transition from the locked mode to the free-wheel mode, the cage is arranged to be axially displaced by one of an actuator or the plurality of resilient elements to:
    insert the first protrusion between the first circumferential end and the third circumferential end;
    displace, with the first protrusion, the first wedge plate segment in the second circumferential direction, and the fourth wedge plate segment in the first circumferential direction;
    contact the second circumferential end with the second protrusion; and,
    displace, with the second protrusion, the third wedge plate segment in the second circumferential direction.

20. The wedge clutch of claim 19, wherein to transition from the free-wheel mode to the locked mode:
  the cage is arranged to be axially displaced by the other of the actuator or the plurality of resilient elements to:
    withdraw the first protrusion from between the first circumferential end and the third circumferential end; and,
    break contact between the second protrusion and the second circumferential end;
  the first resilient element is arranged displace the first wedge plate segment in the first circumferential direction; and,
  the second resilient element is arranged displace the third wedge plate segment in the first circumferential direction.

* * * * *